US011159620B2

(12) United States Patent
Wang et al.

(10) Patent No.: US 11,159,620 B2
(45) Date of Patent: Oct. 26, 2021

(54) BLOCKCHAIN BASED DATA TRANSFORMATION

(71) Applicant: International Business Machines Corporation, Armonk, NY (US)

(72) Inventors: Xinlin Wang, Irvine, CA (US); Jun Zhu, Yangpu District (CN); Zhi Hu Wang, Beijing (CN); Timothy J Hahn, Cary, NC (US); Peng Ji, Nanjing (CN)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 16/386,354

(22) Filed: Apr. 17, 2019

(65) Prior Publication Data

US 2020/0336542 A1    Oct. 22, 2020

(51) Int. Cl.
H04L 29/08 (2006.01)
H04L 9/06 (2006.01)
G06F 16/182 (2019.01)

(52) U.S. Cl.
CPC .......... *H04L 67/12* (2013.01); *G06F 16/1824* (2019.01); *H04L 9/0643* (2013.01); *H04L 67/1097* (2013.01); *H04L 2209/38* (2013.01)

(58) Field of Classification Search
CPC . H04L 2209/38; H04L 9/3239; H04L 9/0637; H04L 9/3247; H04L 63/12; H04L 9/321; H04L 9/3236; H04L 9/3297; H04L 9/0825; H04L 63/0823; H04L 67/12; H04L 9/0643; H04L 67/1097; G06F 16/27; G06F 8/65; G06F 9/4401; G06F 16/1824; G06Q 20/389; H04W 12/06
See application file for complete search history.

(56) References Cited

U.S. PATENT DOCUMENTS

| 10,425,414 | B1* | 9/2019 | Buckingham | G06F 21/35 |
| 2016/0205106 | A1 | 7/2016 | Yacoub et al. | |
| 2017/0208151 | A1 | 7/2017 | Gil et al. | |
| 2017/0234709 | A1* | 8/2017 | Mackie | H04Q 9/00 73/861.08 |
| 2018/0007058 | A1* | 1/2018 | Zou | H04L 63/1408 |
| 2018/0115901 | A1* | 4/2018 | Nenov | G08B 25/08 |

(Continued)

FOREIGN PATENT DOCUMENTS

WO    2018126077 A1    7/2018

*Primary Examiner* — Ninos Donabed
(74) *Attorney, Agent, or Firm* — Patterson + Sheridan, LLP (57) ABSTRACT

Techniques are provided for blockchain based a data transformation. According to one aspect, a series of Internet of Things (IoT) data is received by one or more processing units. And at least one reference data set to the received series of IoT data are attached by one or more processing units. The received series of IoT data attached are processed, by one or more processing units, with at least one transformation module to obtain a processing result of the at least one reference data set. A hash value of the processing result is calculated by one or more processing units. The hash value of the processing result and a hash value of an expected result stored in a blockchain system are compared. In respond to the hash value of the processing result being not matched with the hash value of the expected result, the decision of the at least one transformation module having been tampered with is determined by one or more processing units.

8 Claims, 4 Drawing Sheets

(56) References Cited

U.S. PATENT DOCUMENTS

| | | | |
|---|---|---|---|
| 2018/0183587 A1* | 6/2018 | Won | H04L 9/0891 |
| 2019/0013948 A1* | 1/2019 | Mercuri | G06F 11/3072 |
| 2019/0034936 A1* | 1/2019 | Nolan | G06Q 20/42 |
| 2019/0036906 A1* | 1/2019 | Biyani | H04L 9/3247 |
| 2019/0116142 A1* | 4/2019 | Chalakudi | H04L 67/1097 |
| 2019/0253434 A1* | 8/2019 | Biyani | H04L 63/065 |
| 2019/0311392 A1* | 10/2019 | Swamidurai | G06Q 30/0227 |
| 2020/0044859 A1* | 2/2020 | Srivastava | H04L 9/0894 |
| 2020/0092091 A1* | 3/2020 | Muller | G06F 16/27 |
| 2020/0099531 A1* | 3/2020 | Chidambaram | G06Q 10/0633 |
| 2020/0099575 A1* | 3/2020 | Jan | H04L 41/0663 |
| 2020/0145214 A1* | 5/2020 | Linton | G06Q 20/389 |
| 2020/0177517 A1* | 6/2020 | Pancras | H04L 47/6215 |
| 2020/0184416 A1* | 6/2020 | Javaheri | G06K 7/1417 |
| 2020/0184489 A1* | 6/2020 | Negi | G06F 16/258 |
| 2020/0336542 A1* | 10/2020 | Wang | H04L 67/104 |

\* cited by examiner

BLOCKCHAIN BASED DATA TRANSFORMATION

BACKGROUND

The present invention relates to information management, and more specifically, to a method, system and computer program product for blockchain based data transformation.

Blockchain, is a growing list of records, called blocks, which are linked using cryptography. Each block contains a cryptographic hash of the previous block, a timestamp, and transaction data (generally represented as a merkle tree root hash). By design, a blockchain is resistant to modification of the data. A blockchain system can be used to provide a secure, trusted, distributed storage infrastructure for data management and consumption.

SUMMARY

This summary is provided to introduce a selection of concepts in a simplified form that are further described herein in the detailed description. This summary is not intended to identify key factors or essential features of the claimed subject matter, nor is it intended to be used to limit the scope of the claimed subject matter.

According to one embodiment of the present invention, there is provided a computer-implemented method. According to the method, series of Internet of Things (IoT) data is received by one or more processing units. And at least one reference data set to the received series of IoT data are attached by one or more processing units. And the received series of IoT data attached are processed, by one or more processing units, with at least one transformation module to obtain a processing result of the at least one reference data set. And a hash value of the processing result is calculating by one or more processing units. And the hash value of the processing result and a hash value of an expected result stored in a blockchain system are compared. And in respond to the hash value of the processing result being not matched with the hash value of the expected result, the decision of the at least one transformation module having been tampered with is determined by one or more processing units.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
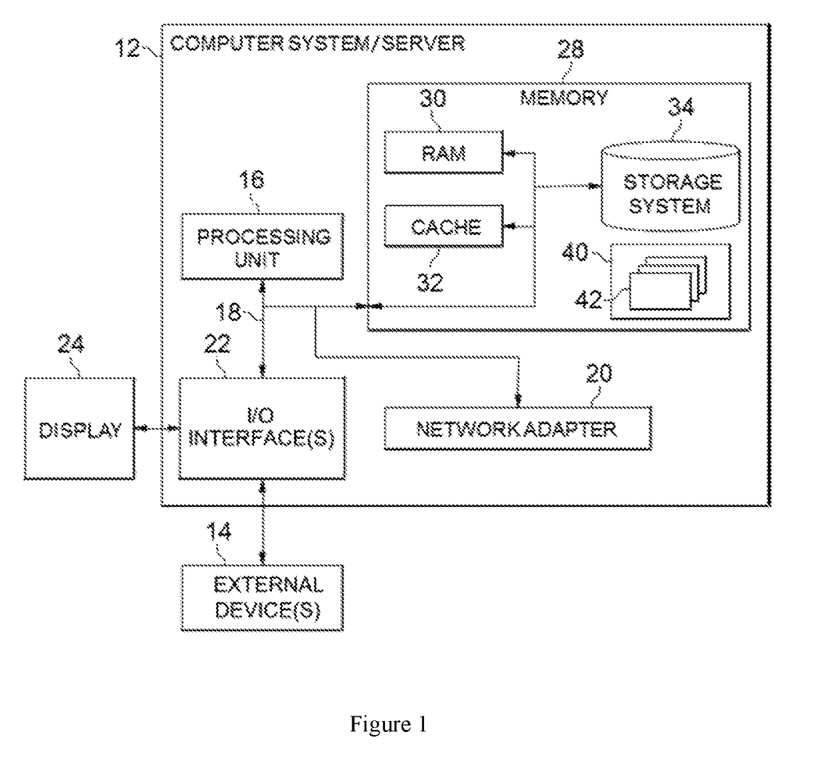
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
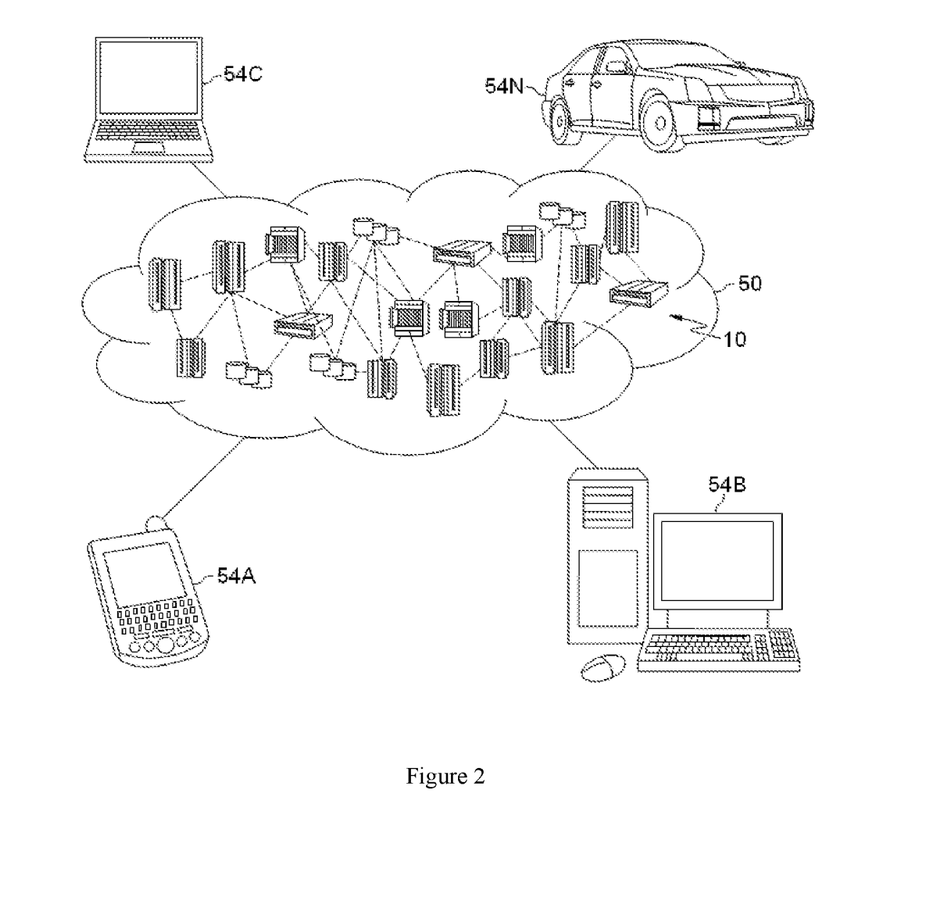
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
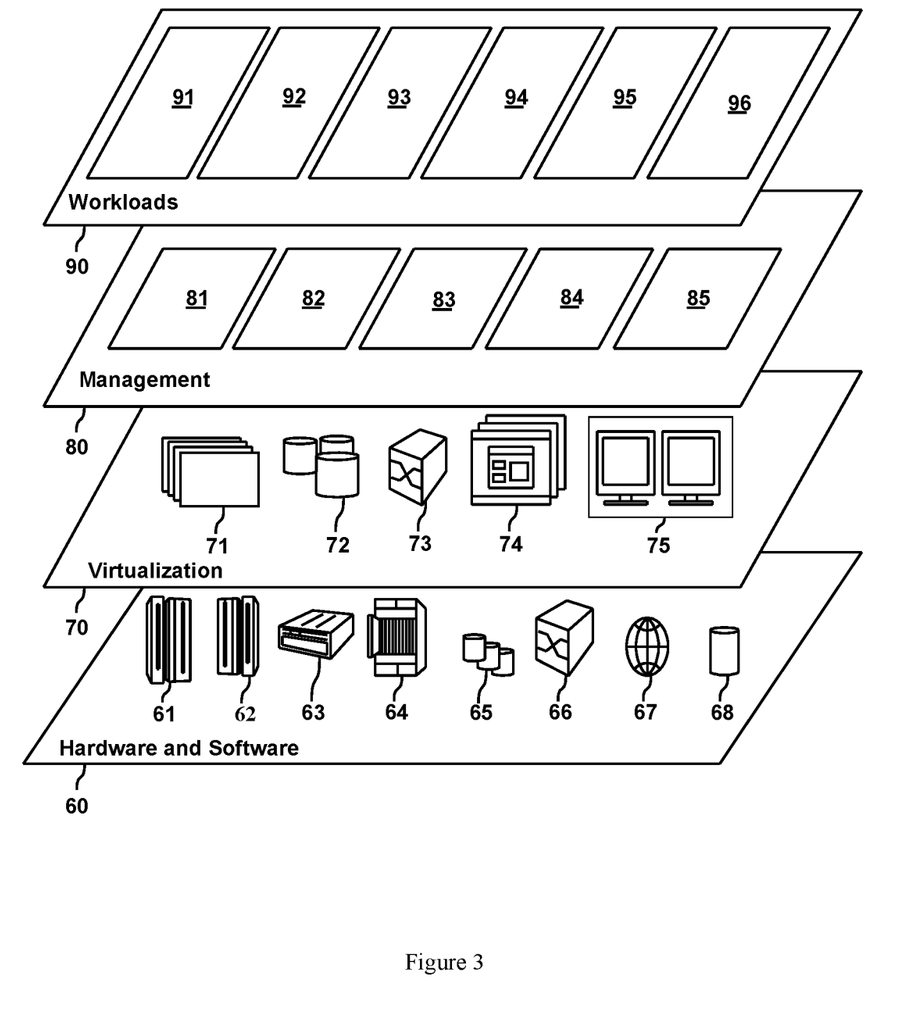
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identification verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and blockchain based IoT data transforming 96.

The internet of things (IoT) is the network of physical devices, vehicles, home appliances, and other items embedded with electronics, software, sensors, actuators, and connectivity which enables these things to connect, collect and exchange data.

It should be pointed out that in the following embodiments of the present invention are described with an internet of things (IoT) data, however, it is only for a better understanding of the present invention thus will not adversely limit the scope of the invention. For example, a person skilled in the art could leverage the methods of this invention to any kind of suitable data, such as the data selected from: autopilot data; medical experimental data; biological data; social network data; e-commerce data etc., it will not be discussed in detail for the other types of data for the purpose of simplifying illustration.

With increasing amounts of IoT data being collected, how to manage the large IoT data becomes problematic. IoT data has specific characters such as huge amount, continuous enriching, and frequent usage on various patterns, e.g. time-series query, location-based retrieving, etc. Another challenge for IoT data management is how to prevent tampering. Blockchain may be a good choice. However, currently a blockchain system could only store data in quite small size, due to the capacity of each blockchain. Therefore, a special design is needed to well store IoT data in a blockchain system, preferably, to efficiently query and locate such IoT data.

Figure 4:
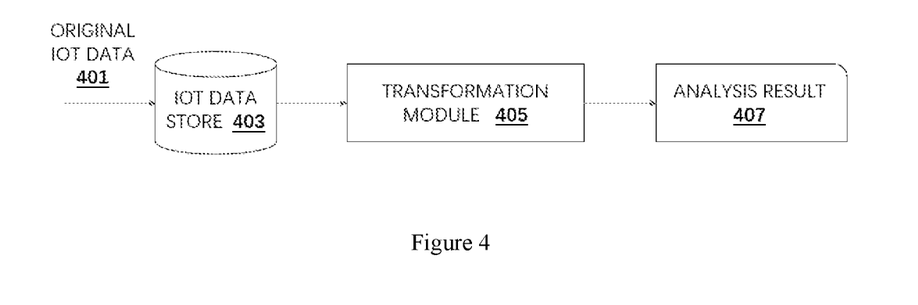
FIG. 4 shows an example block diagram of IoT data transformation.

Now referring to FIG. 4, which shows a block diagram of IoT data transformation. Generally, the original IoT data 401 may be received and stored in the IoT data store 403, and then the original IoT data 401 may be analyzed by the transformation module 405, and the analysis result 407 of the original IoT data 401 may be obtained. In IoT data driven business, there are different data stakeholders owning different public/private data in a whole business lifecycle based on blockchain. Raw IoT data are captured and analyzed/transformed by different stakeholders, and the analysis result is provided to make business decision. One problem is that the deployed analytics code of the transformation module 405 may be tampered with. If the deployed analytics code is tampered, the analysis result would be unexpected and incorrect result, therefore the business decision based on the unexpected and incorrect result will be misleading.

Figure 5:
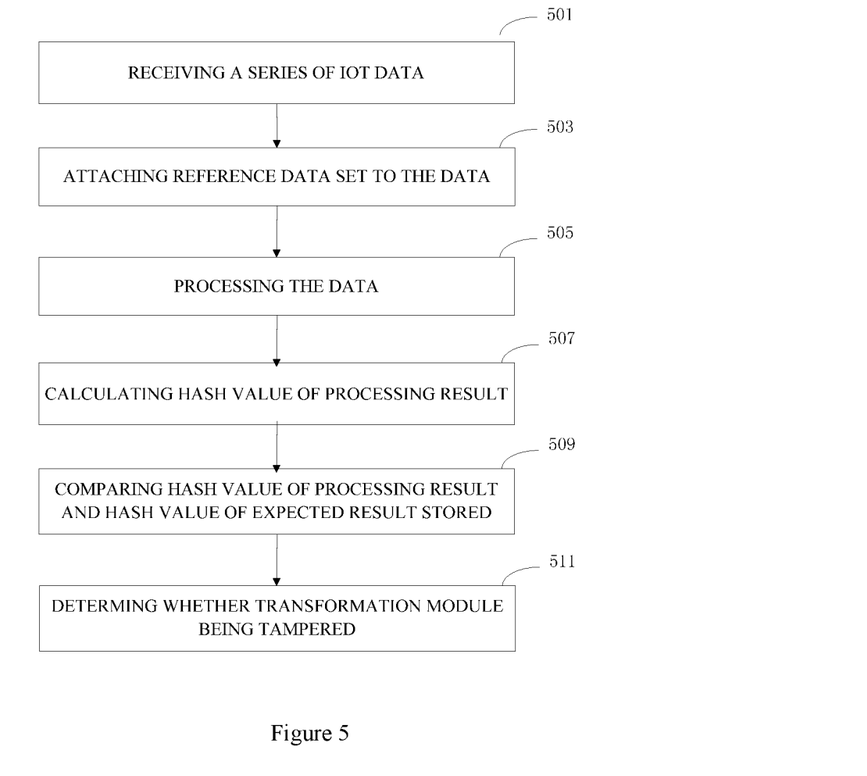
FIG. 5 shows an example flowchart of a method of IoT data transformation based on a blockchain system according to one embodiment of the present invention.

FIG. 5 provides an anti-tempering method of data transformation based on a blockchain system according to one embodiment of the present invention. As shown in FIG. 5, at block 501, a series of IoT data to be analyzed are received by one or more processing units. The series of IoT data may have at least one subgroup data. A typical IoT data is GPS (Global Positioning System) data as: <lon, lat, height, speed, heading, . . . >, wherein lon is longitude, lat is latitude, height is height and speed is the speed of moving object, heading is moving direction.

At block 503, at least one reference data set may be attached to the received series of IoT data. The term "reference data set" means a data set of IoT data for reference to test whether a transformation module is tempered. The reference data set should be not tempered and may be defined by an expert in the field from the original IoT data. The reference data set may be updated when at least one transformation module 405 is changed. The reference data set may full cover all the transformation modules, in other words, each one of all functions of any transformation module have at least one corresponding reference data set. When the IoT data are received, the at least one reference data set may be attached to the IoT data randomly, in other words, it is not necessary to attach the reference data sets to all the subgroup data of the IoT data. In this way, the overhead calculation may be reduced.

At block 505, the received series of IoT data attached with reference data set are processed with at least one transformation module to obtain a processing result of the at least one reference data set, by one or more processing units. In this way, the received series of IoT data can be processed based on the at least one transformation module to obtain the analysis result. In this process, the attached at least one reference data set may be processed at the same time, and the processing result of the at least one reference data set (hereafter "processing result") may be obtained.

At block 507, a hash value of the processing result is calculated, by one or more processing units. A hash function is any function that can be used to map data of arbitrary size to data of a fixed size. The values returned by a hash function are called hash values. A person skilled in the field can leverage any proper hash algorithms in the present invention.

Now referring to the block 509 of FIG. 5, at this block, the hash value of the processing result and a hash value of an expected result stored in a blockchain system are compared, by one or more processing units. In one embodiment of the present invention, the at least one expected result may be generated based on the at least one reference data set and the at least one original transformation module, i.e. the transformation module before being deploying. In one embodiment of the present invention, the hash value of the expected result may be calculated, and the at least one reference data set and the hash value of the expected result may be sent to the blockchain system for storing. As described in the background, the blockchain system can be used to provide a secure, trusted, distributed storage infrastructure for data management and consumption. By leveraging the blockchain system, the at least one reference data set and the hash value of the expected result may be prevented from being tampered with.

Finally at block 511, the at least one transformation module may be determined having been tampered with in response to the hash value of the processing result being not matched with the hash value of the expected result, by one or more processing units. If the hash value of the processing result is not matched with the hash value of the expected result, it means the at least one transformation module deployed is different from the original transformation module, the reason lies that the at least one transformation module deployed generated different analysis result based on the same reference data set. In one embodiment of the present invention, the determining may comprise identifying a function of the at least one transformation module based on a flag of the expected result, wherein the flag corresponds to the function, and the flag may comprise an identification of the corresponding at least one reference data set and the function identification, in a further embodiment, the identification may be generated based on the IoT device identification and the time tag of the at least one reference data set, and it should be clear to a person in the art that that the IoT device identification and the time tag are merely for the purpose of simplifying illustration and will not adversely limit the scope of the present invention. In one embodiment of the present invention, the flag of the expected result may comprise the identification of the at least one reference data set and an identification of the function, wherein a flag of the processing result may be also generated and comprise the identification of the at least one reference data set and an identification of the function. The flag of the processing result may be stored together with the hash value of the processing result as an identification attribute of the hash value, and the flag of the processing result may be stored together with the hash value of the processing result as an identification attribute of the hash value, and the flag of the expected result may be stored together with the hash value of the processing result as an identification attribute of the hash value. Therefore, the hash value of the processing result stored may include the information of the flag of the processing result, and the hash value of the expected result stored may include the information of the flag of the expected result. Then the hash value of the expected result corresponding to the hash value of the processing result may be identified based on the information of the flag of the processing result and the information of the flag of the expected result. In one example embodiment of the invention, the blockchain system supports a query based on the information of the flag of the expected result to get the hash value of the expected result, e.g., GET http://@blockChain-Service/transaction?ticketid=xxx, wherein the ticketid can equal the flag of the expected result as xxx.

It should be pointed out that in the following embodiments of the present invention are described with an internet of things (IoT) data, however, it is only for a better understanding of the present invention thus will not adversely limit the scope of the invention.

Figure 6:
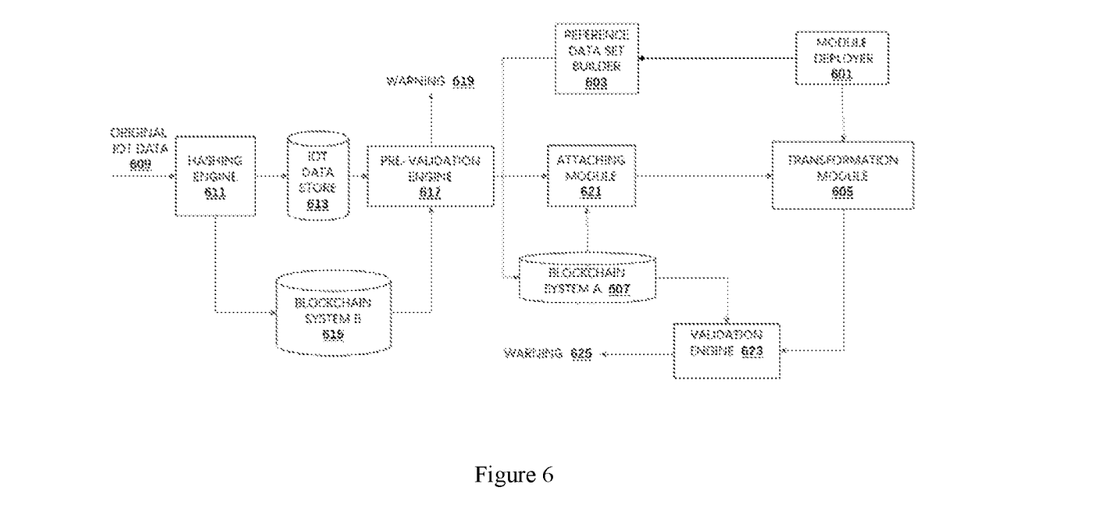
FIG. 6 shows an example block diagram of an IoT data transformation system according to an embodiment of the present invention.

Now referring to FIG. 6, which shows an IoT data transformation system according to an embodiment of the present invention. Usually, a programmer may develop codes of the at least one transformation module 605, and the at least one transformation module 605 may comprise one or more functions. The module deployer 601 may be leveraged to deploy or redeploy the at least one transformation module 605. While deploying the at least one transformation module 605, a reference data set builder 603 may be leveraged to generate reference data sets and corresponding expected result through the at least one transformation module 605. For example, the format of the reference data sets and corresponding expected result may be as below:
Function X: IoT device identification, reference data set, corresponding expected result, e.g., Function X:IoT device identification A, reference data set B, corresponding expected result C, wherein Function X mean a certain functional unit of the transform module, which can receive a reference data set B from a certain IoT device A, complete the definite function and generate corresponding expected result C. And then, the reference data sets and the expected result generated may be stored in a blockchain system A 607. In one embodiment of the present invention, hash values of the expected result generated may be calculated based on any proper hash algorithm (e.g. MD5), and the corresponding hash values may be stored in a blockchain system A 607 so as to make sure that they are unchanged.

In order to protect an original IoT data 609, in one embodiment of the present invention, a hashing engine 611 may be leveraged to hash the received the original IoT data 609 through a certain hash algorithm (e.g. SHA-1), then the calculated hash values may be stored in a blockchain system B 615 together with the identification of the original IoT data 609 so as to make sure that they are unchanged. The original IoT data 609 can be stored in the IoT data store 613. In one embodiment of the present invention, the blockchain system A 607 and the blockchain system B 615 may be a same blockchain system, or they may be different blockchain systems. Then the original IoT data 609 received may be stored into an IoT data store 613.

Before processing the original IoT data 609, in one embodiment of the present invention, the IoT data 609 may be retrieved from the IoT data store 613, and the retrieved IoT data 609 may be hashed to obtain hash values of the retrieved IoT data 609. In one embodiment of the present invention, a pre-validation engine 617 may be leveraged to verify the received IoT data based on the hash values stored in the blockchain system and the hash values of the retrieved IoT data to prevent any tampering of the IoT data 609. If the hash values stored in the blockchain system and the hash values of the retrieved IoT data 609 are not matched, which means the retrieved IoT data 609 may be tampered with, a warning message 619 may be sent to a user of the IoT data 609. If the hash values stored in the blockchain system and the hash values of the retrieved IoT data 609 are matched, the attaching module 621 may attach the reference data set to the retrieved IoT data 609. For example, randomly a reference data set of an IoT device id X may be attached to the verified IoT data 609. Then the attached IoT data 609 may be sent to the at least one transformation module 605 for processing.

The attached IoT data 609 may be processing by the transformation module 605 and the processing result will comprise the processing result of the reference data set and the analysis result of the verified IoT data 609. At the validation engine 623, the processing result of the reference data set may be hashed through the same hash algorithm as the hash algorithm used for the hashing of the expectation result of the reference data set. Then the hash values of the expectation result of the corresponding reference data set may be retrieved from the blockchain A 607. The hash values of the processing result may be compared with the hash values of the expectation result. If they are not matched, the validation engine 623 may send a warning message 625 to a user, wherein the user may be warned that the at least one transformation module 605 may be tampered with, or even which function of the at least one transformation module 605 may be changed after deploying.

It should be pointed out that in the above embodiments of the present invention are described with the IoT data transformation system etc., however, it is only for a better understanding of the present invention thus will not adversely limit the scope of the invention. For example, a person skilled in the art could combine or divide any apparatus of the IoT data transformation system, it will not be discussed in detail for the purpose of simplifying illustration.

It should be noted that the IoT data transformation according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter condition, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by one or more processing units, a series of Internet of Things (IoT) data;
   hashing the series of IoT data to produce a hash result;
   in response to the hash result matching a IoT hash value stored in a first blockchain system, attaching, by the one or more processing units, at least one reference data set to the received series of IoT data;
   processing, by applying analytics code of at least one transformation module implemented by the one or more processing units, the received series of IoT data attached to the at least one reference data set to obtain a processing result of the at least one reference data set;
   calculating, by the one or more processing units, a hash value of the processing result of the at least one reference data set;
   generating, before deployment of the at least one transformation module, an expected result based on the at least one reference data set with the at least one transformation module;
   calculating a hash value of the expected result;
   transferring the at least one reference data set and the hash value of the expected result to a second blockchain system different from the first blockchain system for storing;
   comparing the hash value of the processing result of the at least one reference data set and the hash value of the expected result stored in the second blockchain system; and
   in response to the hash value of the processing result of the at least one reference data set not matching the hash value of the expected result:
      identifying, based on a flag of the expected result, a function in the analytics code; and
      determining, by the one or more processing units, that the function in the analytics code has been tampered with.

2. The method of claim 1, further comprising:
   attaching the at least one reference data set to a subgroup data of the received series of IoT data randomly.

3. The method of claim 1, wherein the flag comprises an identification of the at least one reference data set.

4. A computer system, comprising:
   a processor;

a computer-readable memory coupled to the processor, the memory comprising instructions that when executed by the processor perform actions of:

receiving, by the processor, a series of Internet of Things (IoT) data;

hashing the series of IoT data to produce a hash result;

in response to the hash result matching a IoT hash value stored in a first blockchain system, attaching, by the processor, at least one reference data set to the received series of IoT data;

processing, by applying analytics code of at least one transformation module implemented by the processor, the received series of IoT data attached to the at least one reference data set to obtain a processing result of the at least one reference data set;

calculating, by the processor, a hash value of the processing result of the at least one reference data set;

generate, before deployment of the at least one transformation module, an expected result based on the at least one reference data set with the at least one transformation module;

calculate a hash value of the expected result;

transfer the at least one reference data set and the hash value of the expected result to a second blockchain system different from the first blockchain system for storing;

comparing the hash value of the processing result of the at least one reference data set and the hash value of the expected result stored in the second blockchain system; and in response to the hash value of the processing result of the at least one reference data set not matching the hash value of the expected result:

identifying, based on a flag of the expected result, a function in the analytics code; and determining, by the processor, that the analytics code of the at least one transformation module has been tampered with.

5. The system of claim 4, the actions further comprising attaching the at least one reference data set to a subgroup data of the received series of IoT data randomly.

6. The system of claim 4, wherein the flag comprises an identification of the at least one reference data set.

7. A computer program product, comprising a non-transitory computer readable storage medium having program instructions embodied therewith, the program instructions executable by a processor to cause the processor to perform actions of:

receiving, by the processor, a series of Internet of Things (IoT) data;

hashing the series of IoT data to produce a hash result;

in response to the hash result matching a IoT hash value stored in a first blockchain system, attaching, by the processor, at least one reference data set to the received series of IoT data;

processing, by applying analytics code of at least one transformation module implemented by the processor, the received series of IoT data attached to the at least one reference data set to obtain a processing result of the at least one reference data set;

calculating, by the processor, a hash value of the processing result of the at least one reference data set;

generating, before deployment of the at least one transformation module, an expected result based on the at least one reference data set with the at least one transformation module;

calculating a hash value of the expected result;

transferring the at least one reference data set and the hash value of the expected result to a second blockchain system different from the first blockchain system for storing;

comparing the hash value of the processing result of the at least one reference data set and the hash value of the expected result stored in the second blockchain system; and in response to the hash value of the processing result of the at least one reference data set not matching the hash value of the expected result:

identifying, based on a flag of the expected result, a function in the analytics code; and determining, by the processor, that the analytics code of the at least one transformation module has been tampered with.

8. The computer program product of claim 7, the actions further comprising:

attaching the at least one reference data set to a subgroup data of the received series of IoT data randomly.

* * * * *